Nov. 30, 1943.   A. A. HEJDUK   2,335,671
MANOMETER
Filed Dec. 20, 1940   2 Sheets-Sheet 1

INVENTOR:
ARTHUR A. HEJDUK
BY Robert W. Wilson
ATTORNEY.

Nov. 30, 1943. A. A. HEJDUK 2,335,671
MANOMETER
Filed Dec. 20, 1940 2 Sheets-Sheet 2
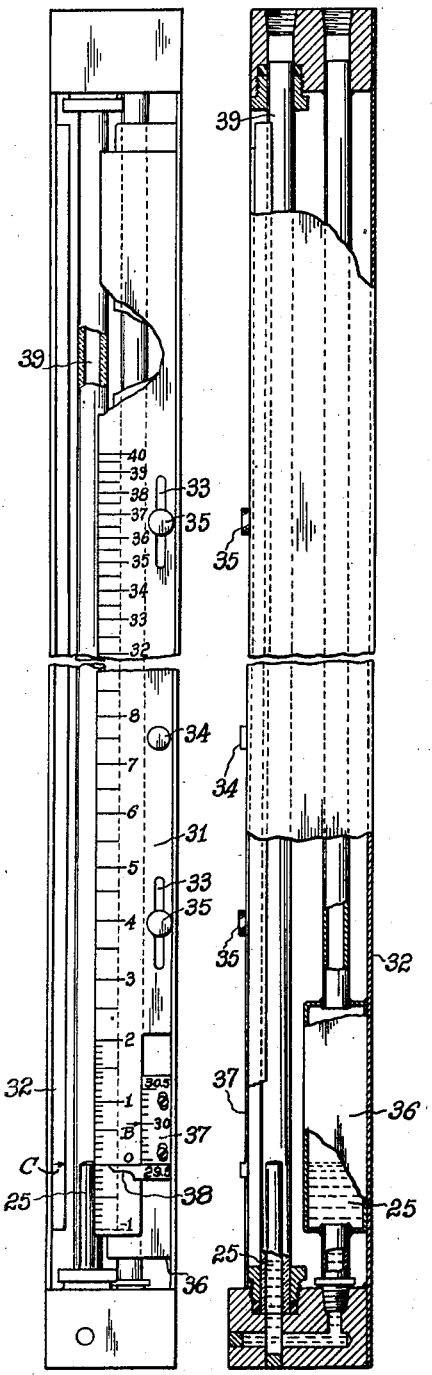
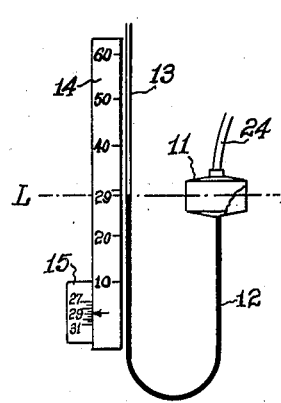
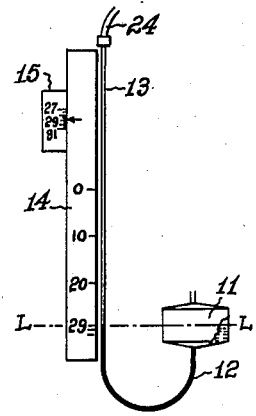
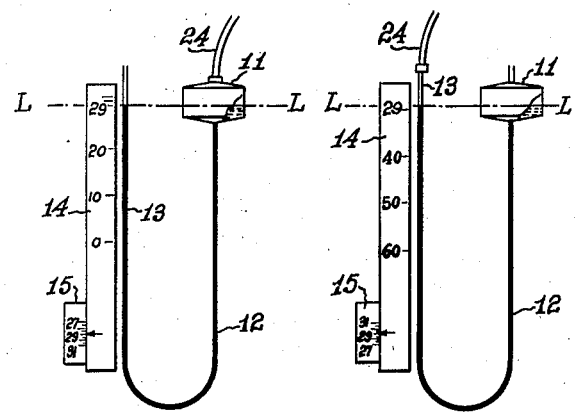
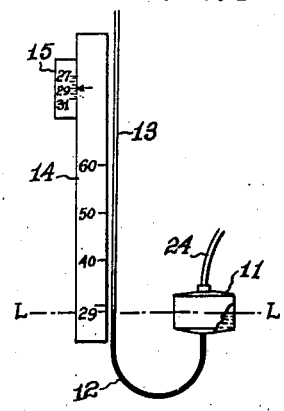
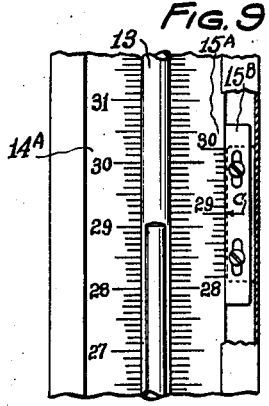
INVENTOR:
ARTHUR A. HEJDUK
BY Robert W. Wilson
ATTORNEY.

Patented Nov. 30, 1943

2,335,671

UNITED STATES PATENT OFFICE 2,335,671

MANOMETER

Arthur A. Hejduk, Cleveland, Ohio, assignor to The Meriam Company, Cleveland, Ohio, a corporation of Ohio Application December 20, 1940, Serial No. 370,937

4 Claims. (Cl. 73—31)

In using a manometer for testing stack draft, carburetor air consumption, especially for test runs of aircraft engines, as well as for stack draft measurements and other similar purposes, the barometric pressure is an important factor because the air consumption is based on density as well as volume. My invention relates to giving manometers improved capabilities for such uses, and is specifically intended to provide a manometer having certain novel scale and correction arrangements, including a movable datum point and a scale against which the same may be read. My invention may be used in either of two ways. First the datum point can be so moved during the run as to compensate for barometric changes occurring, and thus enable the readings of the mercury to show directly the pressure conditions in the apparatus undergoing test, without corrective calculations. Second, if the datum point is not moved against its scale during the run, it can be used to tell what the barometric pressure was at the start of the run without having to stop the test, open both sides of the manometer to atmosphere, and let the mercury settle to its original level. The first use, which is the more important, eliminates the need of keeping a record of changes in atmospheric pressure during the test. In test runs of the sort indicated the fluctuations of air consumption may be frequent and rapid, moving the mercury column fast and often. Under such circumstances readings must be frequent, so that it is much quicker and more accurate work can be done when the barometric correction is automatically included in the reading than when it has to be computed. Such human factors as errors of computation, or mistakes in having an assistant note the readings, are eliminated.

Another object of the invention is to provide a compact and convenient arrangement of scales whereby a scale for barometric compensation can be applied to the manometer without increasing the size of the case or complicating the structure.

A further trouble which my invention eliminates is that it avoids the need for great accuracy in filling the manometer to bring the mercury exactly to a level with a gauge index mark.

In order to avoid all these inconveniences I have provided a scale or barometer compensator which can be applied to the main scale of a manometer and which will not be affected by any position the column of mercury may assume during the test run, such compensator scale being usable either to permit a direct reading of absolute pressure on the main scale, or to show what the barometric height was at the beginning of the test.

Additional advantages of my invention will be apparent to persons skilled in the art from reading the following disclosure of preferred forms of my invention. In the drawings hereto appended, showing such preferred forms, Figs. 1, 2 and 3 are respectively front, side and transverse sectional views of a preferred form of my manometer, Figs. 1 and 2 being principally in elevation but with parts in section, and Fig. 3 being taken on plane 3—3 of Fig. 1;

Fig. 4 is a partial front elevation of a modified scale arrangement, with parts broken away;

Fig. 5 is a side view of the same, partly in section;

Figures 1, 2, 3:
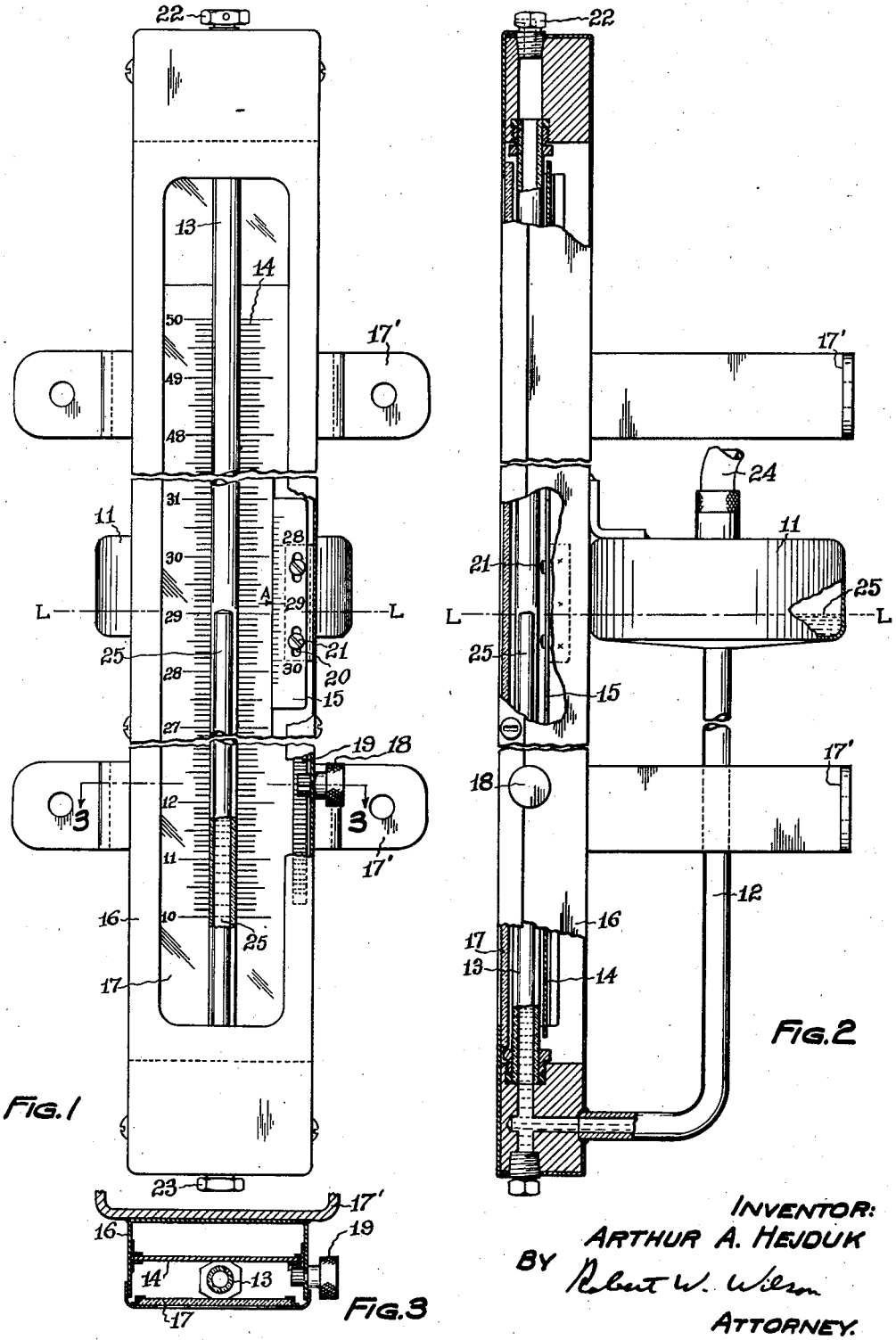

Figs. 6 to 10 inclusive are diagrammatic drawings indicating various hook-ups of my manometer; and Fig. 11 is a partial front elevation of a further modification.

It will be appreciated that the principle of my invention may be variously applied by using scales graduated in units of value and for ranges according to the specific purposes for which the manometer is to be used. Generally speaking my manometer is intended for use in fixed location, and, mainly to prevent the scales from being needlessly long, the barometric compensator (auxiliary) scale is graduated for ranges of values to be encountered at sea level or some hundreds of feet above, which comprises most of the industrial section of the country. Different scales, appropriately graduated, would be applied to instruments for use at higher altitudes. It will further be noted that although I show one form of instrument with a main scale graduated in thousands of feet, the barometer compensator thereon extends for a range on the order of only a few inches. This is because the instrument is intended for use in a fixed position, although calibrated to measure artificially produced atmospheric conditions corresponding to various altitudes.

Figs. 1, 2 and 3 show a well type manometer reading in inches of mercury, with well 11 connected by a tube 12 to a stationary glass tube 13 against a scale 14 here shown as graduated in inches and movable for a limited distance up and down. A barometer compensator scale 15, also movable up and down for a short distance, is shown beside the main scale. The tube 13 and scales 14 and 15 are enclosed in a case 16 with a window 17. Suitable fastening attachments, such as brackets 17' are provided.

The main scale 14 is indicated as movable through a sufficient amplitude to cover a range of variations in barometric pressure, the apparatus for accomplishing the movement being conventionally indicated by a finger wheel 18 operating a pinion geared to the rack 19 on the scale. The compensator scale 15 is movable through a lesser range by slots 20 and fastened by screws 21. This adjustment of the compensator scale is needed only when filling the manometer, so the screws 21 are accessible only by removing the case 16. The manometer can be filled through the well 11, air in the tube 13 venting through top plug 22. It can be drained by removing bottom plug 23. A tube 24 connects the well 11 to the point at which measurement is being taken, or similar connection may be made at the top plug 22, which is vented, or both at 22 and 24, all according to circumstances.

To set up my apparatus, mercury 25 is poured into the well until it stands at any convenient level L—L, Figs. 1 and 2. A barometer reading is now taken; assume this to be 29 inches. The main scale 14 is moved up or down until top of the column in the tube 13 reads 29″. The arrow A, which is marked on the main scale at any convenient position, should now read 29″ on the compensator scale; if it does not, the compensator scale is adjusted up or down by screws 21 and slots 20 until it does, thus avoiding the need of accuracy in filling the manometer. Appropriate connection is then made to the carburetor, pipe, stack or other instrumentality in which pressure is to be measured, and the test run is begun. If it is desired to adjust the readings to changes in barometric pressure during the run, this can be done without disconnecting the apparatus or interfering with the run, by moving the main scale up or down, thus bringing the arrow A opposite the appropriate reading on the compensator scale 15. Because such barometric correction is made against a scale and not against the mercury 25, there is no trouble in making the correction even if the column is unsteady. Were it not for the scale 15, such correction would be impossible without disconnecting the manometer and letting the mercury settle at the level L—L. Using the instrument in this manner the correction is included in the readings; that is, the readings are absolute pressure. If the instrument is used without changing the setting of the main scale, the initial barometric reading can always be ascertained by reference to the compensator scale.

It will be observed that the graduations on the main and compensator scales are in opposite sense, so that the reading of the column 25 against the main scale 14 always agrees with the reading of the arrow A against the compensator scale 15.

Figs. 4 and 5 illustrate my manometer arranged for reading altitudes instead of inches of mercury. Herein the main scale 31 is conveniently a strip on the front of the casing 32, movable along slots 33 by a knob 34 and clamped by screws 35. The well 36 will be near the bottom since only a short range of sub-sea level altitudes has to be provided for. The compensator scale 37 carries a pointer 38 at its bottom; the graduations on the compensator scale 37 run only upwards from the pointer; the arrow B on the main scale, corresponding to A of Fig. 1, is permanently marked at a distance above 0 (sea level) equal to a barometric pressure of 29.92″, which is the sea level barometric reading corrected for normal conditions of temperature and pressure. As a matter of convenience another arrow C may be placed on the casing 32 to indicate a convenient filling level for the mercury 25 in the tube 39 but the compensator scale 37 is adjustable, so that if the mercury is not quite to the right level correction can be made by bringing the zero mark on the main scale to the top of the meniscus and bringing the pointer 38 to the zero mark.

With the arrangement shown in Fig. 4, the mercury having been filled more or less to the arrow C, correction for amount of fill is made as just described. If the actual barometer reading at the time and place of starting the run is 29.92″, no further correction has to be made, the manometer is connected to the apparatus undergoing test, the run starts, and readings are taken in terms of equivalent altitude. However, if the barometer is other than 29.92″, a further correction is made by moving the main scale 31 until the arrow B points to the figure for the actual barometer reading. Thereby all readings of the mercury column are made directly in terms of absolute altitude. If necessary and desired the main scale may be again adjusted relative to the compensator scale from time to time during the run, without disconnecting the manometer or stopping the run.

Several possible connections and several possible ranges of the main scale are shown diagrammatically in Figs. 6 to 10 inclusive. These are all shown in the drawings in terms of inches of mercury, but of course could be in altitude or other values if desired.

Fig. 6 shows the left limb of the manometer open to atmosphere and the well connected to the test apparatus. The main scale runs from 10 inches to 60 inches. With such a scale, set appropriately according to the barometer reading, the readings of the mercury column will be directly in absolute pressure, whether such pressure be above or below the barometric pressure.

Fig. 7 shows an arrangement for reading absolute values below barometric pressure, the scale being graduated from 31 to 0 inches, the connection to the test apparatus being at the top of the tube 13, and the well 11 low down and open to atmosphere. An example of a situation where this might be used is for measuring the pressure in an engine testing room simulating high altitude conditions. Obviously the apparatus of Fig. 4 could be used here, with scale graduated in altitude instead of inches. Another arrangement for obtaining readings below normal barometric pressure is that of Fig. 8, where the scale 14 reads upward, say from 0 to 31 inches, the well is opposite the upper end of the scale, and the test connection 24 is to the well.

Figs. 9 and 10 show arrangements for reading absolute pressures above barometric pressure. In Fig. 9 the scale is graduated downwards, with 29 inches at the top and 60 inches at the bottom, the well opposite the top, the connection 24 at the upper end of the tube 13, and the well open to atmosphere. In Fig. 10 the same result is attained by graduating the scale upwards, say from 29 to 60 inches, with well opposite the lower end and connected to the test apparatus, while the upper end of the tube 13 is open to atmosphere.

Fig. 11 illustrates a variant of the arrangement shown in Figs. 1 and 4. Here the main scale 14A is movable by suitable means (not shown), and the compensator scale 15A is marked on the main scale. The compensator index arrow C, corresponding to B in Fig. 4, is marked on a movable plate 15B fastened to the casing and capable of being set up or down to allow for differences in fill.

Although I have shown and described certain preferred forms of my invention, with some of the more important modifications, it will be apparent to those familiar with this art that this invention is capable of various other modifications and changes in detail, all within the scope of the following claims.

I claim:

1. In a manometer having a single column of liquid contained within a tube for reading, a main scale graduated in terms of absolute pressure throughout the range the manometer is intended to measure, means for moving said main scale comfortably to the natural barometric changes to be expected in the altitude zone in which the manometer is intended for use, a barometer compensator scale graduated according to natural barometric changes to be expected in the altitude zone in which the manometer is intended for use, and an index on same main scale adapted to read against said barometer compensator, both said main scale and said barometer compensator scale being separately movable with respect to said tube and said column of liquid, whereby adjustment of said scales to said column of liquid may be readily made to compensate for variations in the well of liquid in said manometer.

2. In a manometer having a single column of liquid contained within a tube for reading, a liquid well of large cross sectional area compared to the cross sectional area of said column of liquid, a main scale adjacent said column of liquid to read the height thereof in values which the manometer is intended to measure, a barometer compensator scale graduated for the range of barometric variations of the region wherein the manometer is intended for use, an index for indicating the position of said main scale relative to said barometer compensator scale, both of said scales and said index being adjustable with the compensator scale and index being adjustable relative to each other, whereby said manometer may be readily adjusted according to the height of liquid to which the liquid well is filled.

3. In a manometer having a single column of liquid contained within a tube for reading, a liquid well connected therewith having a very large cross sectional area compared to the cross sectional area of said column of liquid, a main scale graduated in terms of altitude throughout the range the manometer is intended to measure, means for moving said main scale conformably to the natural barometric changes to be expected in the zone in which the manometer is intended for use, a separate barometer compensator scale graduated according to natural barometric changes to be expected in the zone in which the manometer is intended for use, and an index indicating the relative positions of said main scale and said barometer compensator scale, said barometer compensator scale and said main scale being separately movable with respect to said tube and with respect to each other, whereby said manometer may be readily adjusted according to the height of liquid to which the liquid well is filled.

4. In a manometer having a single column of liquid contained within a tube for reading, a liquid well of large cross sectional area compared to the cross sectional area of said column of liquid, a main scale adjacent said column of liquid to read the height thereof in values which the manometer is intended to measure, a barometer compensator scale graduated for the range of barometric variations of the region wherein the manometer is intended for use, said compensator scale being in fixed position relative to said main scale, an index for indicating the position of said main and compensator scales, said main scale and said index being separately movable with respect to said tube and with respect to each other, whereby said manometer may be readily adjusted according to the height of liquid to which the liquid well is filled.

ARTHUR A. HEJDUK.

CERTIFICATE OF CORRECTION.

Patent No. 2,335,671.  November 30, 1943.

ARTHUR A. HEJDUK.

It is hereby certified that error appears in the printed specification of the above numbered patent requiring correction as follows: Page 3, first column, line 19, claim 1, for "comfortably" read --conformably--; and that the said Letters Patent should be read with this correction therein that the same may conform to the record of the case in the Patent Office.

Signed and sealed this 1st day of February, A. D. 1944.

(Seal)
Henry Van Arsdale,
Acting Commissioner of Patents.